United States Patent [19]

Langenberg et al.

[11] Patent Number: 4,709,389
[45] Date of Patent: Nov. 24, 1987

[54] TELEPHONE HOOK SWITCH WITH ELASTOMERIC CONTACT MEMBER

[75] Inventors: Anthony J. Langenberg, Kanata; Pak-Jong Chu, Nepean; John S. Moss; Geoffrey A. Collar, both of Ottawa, all of Canada

[73] Assignee: Northern Telecom Limited, Montreal, Canada

[21] Appl. No.: 713,441

[22] Filed: Mar. 18, 1985

[51] Int. Cl.$^4$ .............................................. H04M 1/08
[52] U.S. Cl. .................................... 379/424; 379/368; 379/429
[58] Field of Search ................... 179/164, 159, 100 D, 179/100 R, 90 K, 158 R; 379/424, 429, 368, 436, 420, 422

[56] References Cited

U.S. PATENT DOCUMENTS 4,328,399  5/1982  Perks et al. ...................... 340/365 S
4,365,118  12/1982  Lindman et al. ..................... 379/420
4,556,763  12/1985  Draguneviaus et al. ........... 379/424

FOREIGN PATENT DOCUMENTS 3033365  3/1982  Fed. Rep. of Germany ...... 379/422

Primary Examiner—Thomas W. Brown
Attorney, Agent, or Firm—Sidney T. Jelly

[57] ABSTRACT

A telephone hook switch uses an elastomeric member as the contact making member. A hook switch has a pivotally mounted actuating member having two levers extending in opposite directions, one on each side of the pivot axis. One lever is moved by the positioning, and removal, of a handset, the actuating member being biased to a particular pivotal direction. The other lever presses on a deformable projection in the elastomeric member. Depression of the projection causes an electrically conducting layer to move into contact with contact areas of a switch position on a printed circuit board.

1 Claim, 7 Drawing Figures

TELEPHONE HOOK SWITCH WITH ELASTOMERIC CONTACT MEMBER

This invention relates to telephone hook switches and is particularly concerned with a hook switch which has an elastomeric contact member.

Telephone sets have used elastomeric members as contact members for pushbuttons. The travel of such buttons is quite short, and is acceptable. Hook switches are usually actuated by replacement of a handset on a base and the actuator contacted by the handset usually has a relatively long travel. Also, it is necessary to ensure that an acceptable balance of forces occurs to ensure that effective operation of the switch occurs and yet at the same time there is no tendency for the actuator to push off the handset.

It has been usual to provide some form of spring cantilever contact arrangement as a hook switch. However, with the extended use of elastomeric contact members elsewhere and the reduction in size of other components of the telephone set, particularly due to the use of electronic devices, it would be convenient to be able to make all switch contact members as one integrated member, or at least of the same form, even if in more than one part, and have all the switch contacts as parts of an electrical circuit pattern on a circuit board.

The present invention provides a telephone set hook switch which has an elastomeric contact member. The elastomeric contact member can be formed as part of a larger elastomeric member which has contact members for other switches, such as dial pushbuttons and other pushbuttons. The hook switch contact member makes contact with contact areas forming a switch position on a circuit board, other switch positions also being provided on the circuit board for the other pushbuttons.

The hook switch comprises a pivotally mounted actuating member having one end projecting into the cup for housing one end of the telephone handset and the other end positioned on a deformable projection in an elastomeric member. The deformable projection is positioned over a switch position on a circuit board. Depression of the one end of the actuating member by the handset pivots the actuating member to raise the other end of the actuating member. Removal of the handset permits biased pivotting of the actuating member to cause depression of the deformable projection. A conductive area in the projection makes contact with contact areas at the switch position.

The invention will be readily understood by the following description, in conjunction with the accompanying drawings, in which.

Figure 1:
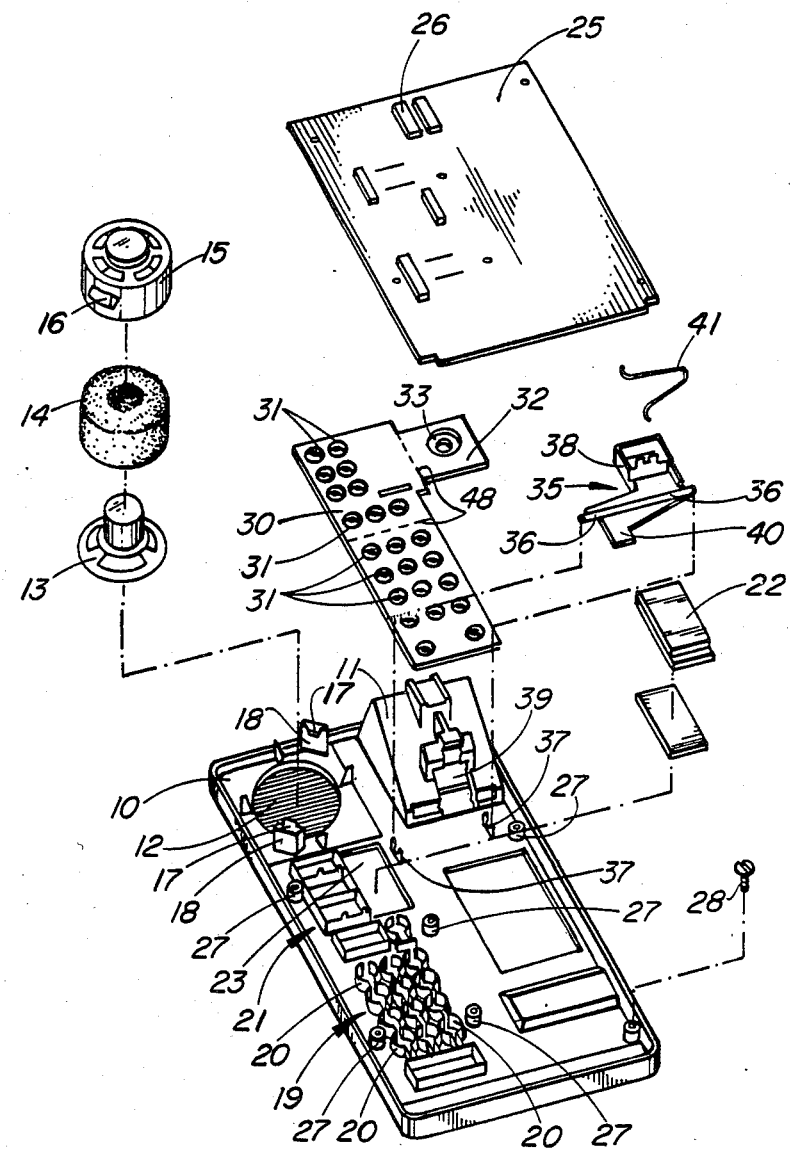
FIG. 1 is an exploded perspective view of the underside of a front cover of a telephone set base, with associated items which are assembled thereto.

As illustrated in FIG. 1, the top cover of a telephone set base is seen inverted, at 10, showing the underside of the cover. At one end, normally referred to as the top end, is formed a recess or cup for reception of one end of a handset, usually the receiver end. The recess is formed by the upwardly projecting formation 11. To one side of the formation 11 is a grill 12 over which is mounted a ringer assembly comprising the speaker or generator 13, a foam backing member 14 and a housing 15. Protrusions 16 on the housing 15 engage beneath projections 17 on upstanding ribs 18 to hold the assembly in position.

At the other end of the housing from the grill 12 is a pushbutton dial position, indicated generally at 19. This has a plurality of tubular extensions 20 surrounding apertures in the cover, pushbuttons being positioned in the tubular extensions and extending up to the apertures. Additional special service buttons can be provided, at 21 and indicator lamps 22 can be mounted at 23.

A circuit board 25 carries on one surface, the top surface, a circuit pattern, while electrical and electronic components are mounted on the back surface. Some components are indicated in FIG. 1 at 26. The circuit board is attached to the top cover, resting on hollow pillars 27. Screws 28 pass through the circuit board into the pillars. Positioned between the circuit board and the pushbutton positions is an elastomeric member 30. The elastomeric member has a plurality of deformable contact members 31, one for each pushbutton position. In the example, it also has an extension 32 which has a deformable contact member 33 for the hook switch. Alternatively, the extension can be a separate part, or a part of a longer portion containing some of the deformable contact members. Thus it can be convenient to make an elastomeric member just for the dial pad pushbuttons, with the remaining pushbuttons activating contact members on a separate elastomeric member. Typical separation lines are indicated by dotted lines 48 in FIG. 1.

The hook switch actuator is indicated at 35. It is pivotally mounted on the undersurface of the cover 10 by means of two cylindrical pivot members 36 extending one on each side, the pivot members snapping into pivots 37 on the cover. At one side of the pivot members extends a lever 38 which extends through an aperture 39 in the formation 11. This enables the lever 38 to extend into the recess occupied by the handset and be acted upon by the handset. A further lever 40 extends in the opposite direction to lever 38 and overlies the hook switch contact member 33 when assembled. A spring 41 acts to bias the actuator to a position in which lever 38 projects up into the handset recess and lever 40 is moved into contact with, and collapses, the contact member 33 thus causing the contact member 33 to contact the contact areas of the switch position for the hook switch. This will be described later in conjunction with FIGS. 4 and 5.

Figure 2:
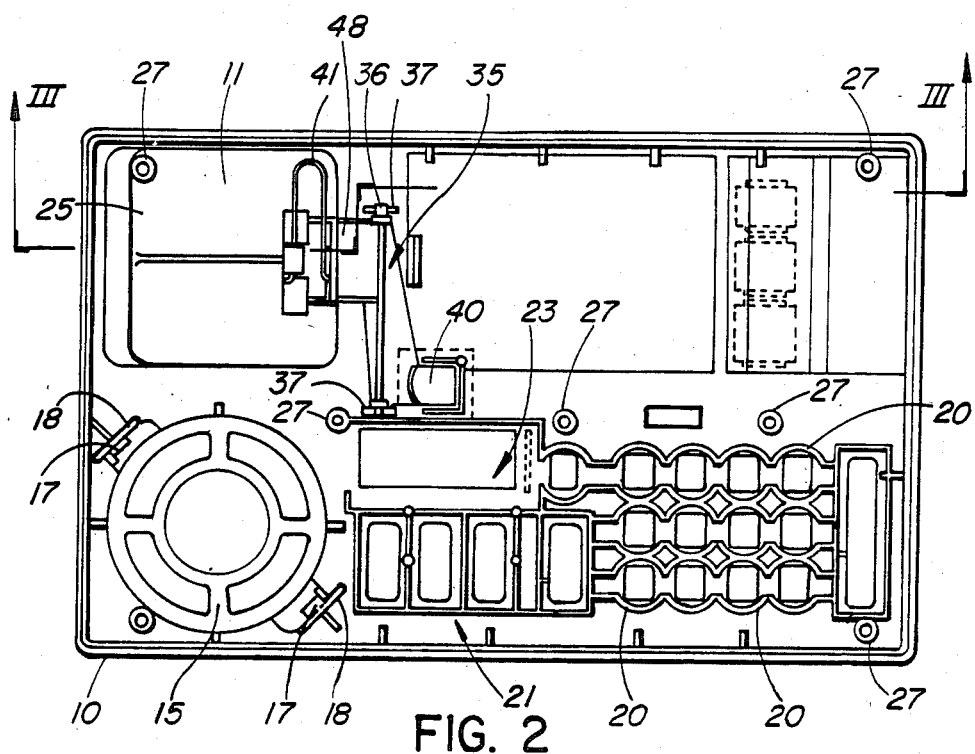
FIG. 2 is a plan view on the underside of the front cover in FIG. 1 with some items assembled.

FIG. 2 illustrates the cover 10 with the ringer assembly in position, the housing 15 being seen. The hook switch actuator 35 is also seen in position. For clarity, the elastomeric member 30 and circuit board 25 are omitted.

Figure 3:
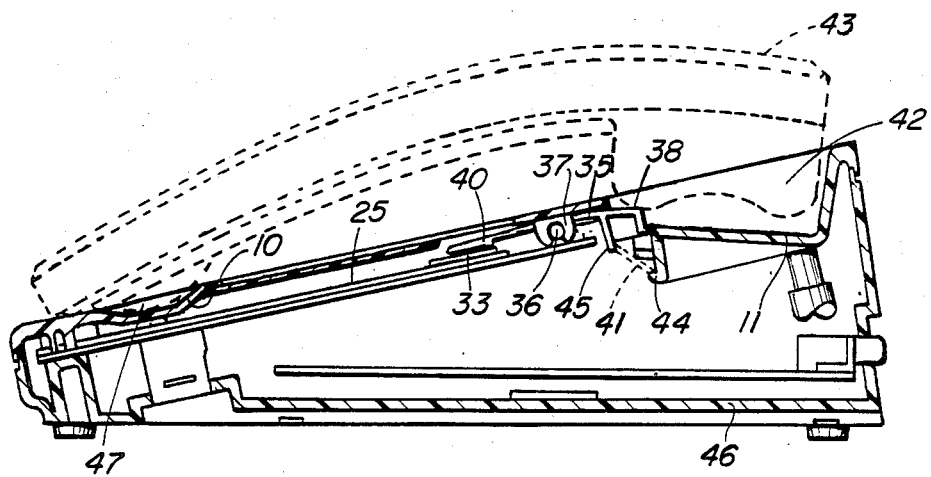
FIG. 3 is a cross-section through a telephone set, as on the line III—III of FIG. 2.

FIG. 3 illustrates a telephone set, the base being in cross-section and the handset being in dotted outline. The recess formed by the formation 11 is indicated at 42. The handset, indicated at 43, is shown at a position where it is just clear of the lever 38 of the actuator 35.

This would be the position just prior to replacement of the handset, to go off-hook, or just after the handset was starting to be lifted, to go on-hook. The spring 41 extends between a locating and seating member 44 on the formation 11 and a seating 45 formed on the actuator 35. The spring biases the lever 38 end of the actuator 35 upward into the recess 42 and causes the lever 40 to depress the contact member 33.

The bottom housing of the telephone set base is indicated at 46. A small recess 47 is formed in the cover for positioning the transmitter end of the handset. The bottom housing and top cover are held together by screws which cooperate with some of the hollow pillars 27.

Figure 4:
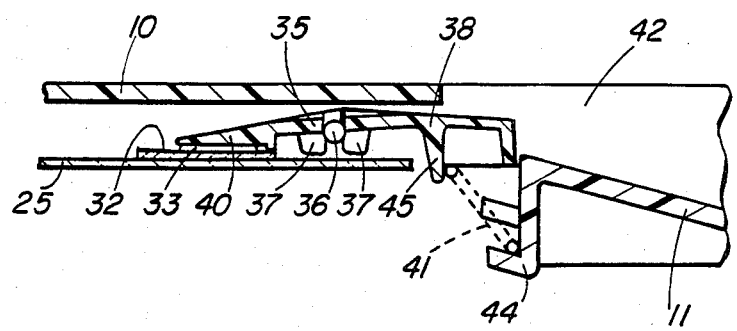
FIGS. 4 and 5 are slightly enlarged detailed views of the hook switch assembly, as in FIG. 3, showing the two alternate on-hook and off-hook positions.
Figure 5:
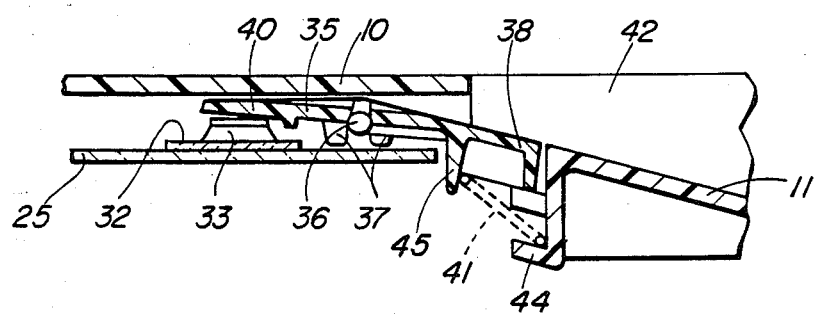

FIGS. 4 and 5 illustrate the hook switch in the two alternative positions, FIG. 4 being on-hook and FIG. 5 off-hook. In FIG. 4, the situation is as in FIG. 3. The actuator is in the "free" position, that is in the position to which it is biased by the spring 41. The lever 38 projects into the recess 42 and lever 40 is depressing the contact member 33. A conductive area on the contact member 33 makes contact with contact areas on the circuit board 25, making a connection between two separate contact areas to complete a circuit.

On replacement of the handset, or by using a finger, the lever 38 is pushed down, to the position shown in FIG. 5. In so doing, the actuator is pivoted and lever 40 lifts, releasing the contact member 33. This breaks contact with the contact areas on the circuit board.

Figure 6:
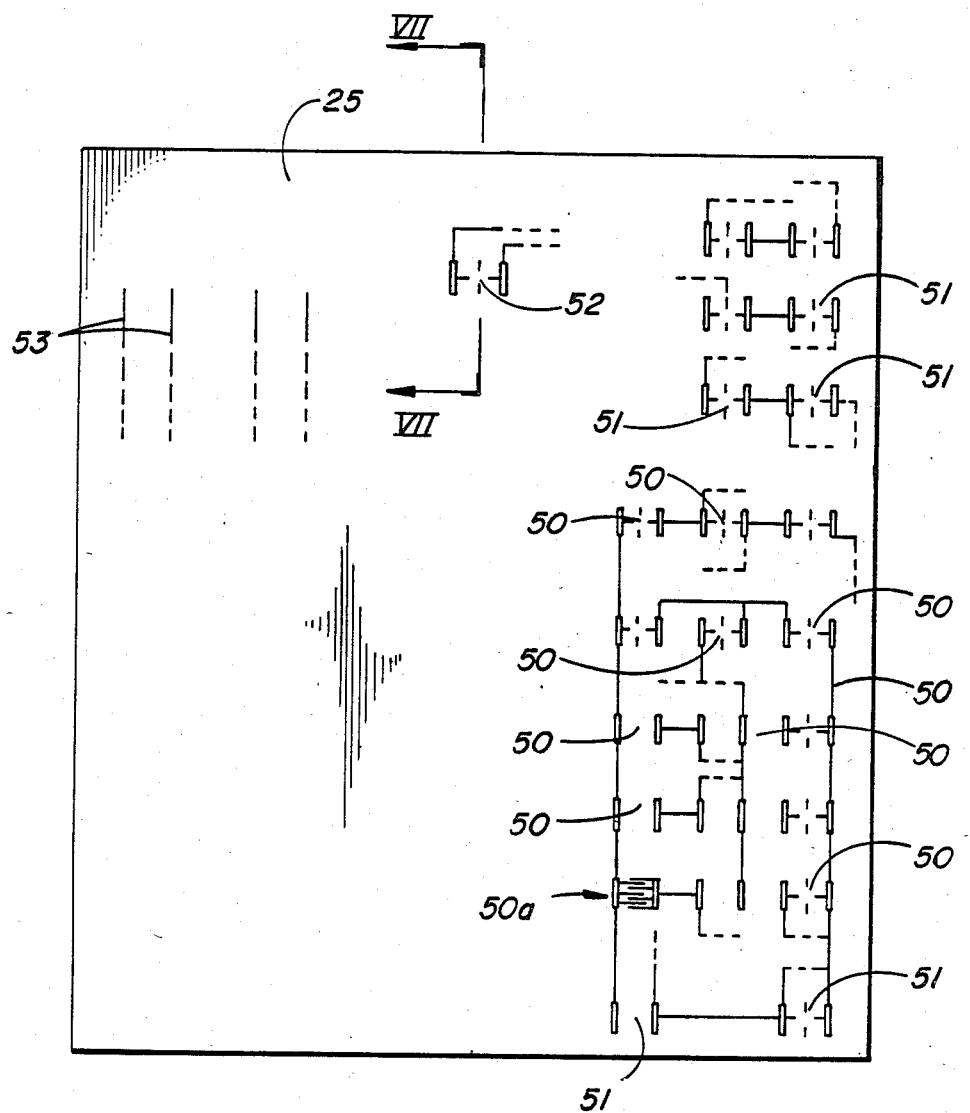
FIG. 6 is a plan view of the upper surface of the circuit board shown in FIG. 1.

FIG. 6 illustrates very diagrammatically the top surface of the circuit board 25. The switch positions for the dial pushbuttons are shown at 50 and switch positions for other pushbuttons are shown at 51. The switch position for the contact member 33 is shown at 52. A circuit pattern is indicated at 53. Each switch position normally has two sets of contact areas, as shown at 50a. The particular arrangement of the contact areas can vary, being as shown, or being arranged in a radial or circular array or as desired. The objective is that on depression of a contact member, a conductive part of the contact member bridges at least one of each set of contact areas to make a circuit. Interleaving the contact areas allows for some misalignment.

Figure 7:
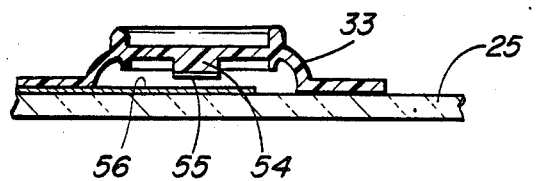
FIG. 7 is a cross-section on the line VII—VII of FIG. 6 showing the elastomeric member, deformable projection and circuit board.

FIG. 7 is a cross-section, as on the line VII-VII of FIG. 6, with the contact member 33 in position. As shown in FIG. 7, the contact member has a central projection 54 having a layer of conductive material 55 thereon. When the contact member is depressed, the layer 55 makes contact with contact areas of the circuit pattern, indicated at 56 in FIG. 7.

The invention provides a very convenient arrangement in that all or most of the components can be mounted on the inside of the cover, in a continuous automated assembly. The hook switch actuator would be assembled to the cover, then the elastomeric member or members placed in position and then the circuit member, with the components already mounted thereon, positioned and fastened in place. A minimum of individual parts are required.

What is claimed is:

1. A telephone set base having a bottom housing and a cover, a pushbutton dial assembly in said cover and a recess in said cover for reception of a transducer housing of a telephone handset; said pushbutton dial assembly comprising a circuit board having a circuit pattern on an upper surface, said circuit pattern including a plurality of switch positions, a switch position for each pushbutton and also including a further switch position for a hook switch; an elastomeric member positioned over said circuit board and including a plurality of deformable contact members, a contact member aligned with each switch position; a further deformable contact member aligned with said further switch positions; a hook switch actuating member having opposite ends and being pivotally mounted on said cover at a position intermediate its ends, said actuating member including a first lever extending on one side of the pivotal axis of the actuating member in a direction normal to said pivotal axis and having an end positioned over said further deformable contact member, and a second lever extending on the other side of said pivotal axis in a direction normal to said pivotal axis, said second lever extending into said recess in said cover; biasing means resiliently biasing said actuating member whereby said first lever is urged toward said circuit board and to depress said further deformable contact member and said second lever extends above a bottom surface of said recess, the arrangement such that on positioning the transducer housing in said recess, said second lever is depressed to pivot said actuating member and move said first lever away from said circuit board and free said further deformable contact member.

* * * * *